G. H. FRASER.
MACHINE FOR CRUSHING OR GRINDING.
APPLICATION FILED MAR. 16, 1905. RENEWED JULY 3, 1916.

1,222,382.

Patented Apr. 10, 1917.
5 SHEETS—SHEET 2.

WITNESSES:
Fred White
René Breine

INVENTOR:
George H. Fraser,
By Attorneys,
Arthur E. Fraser & Co

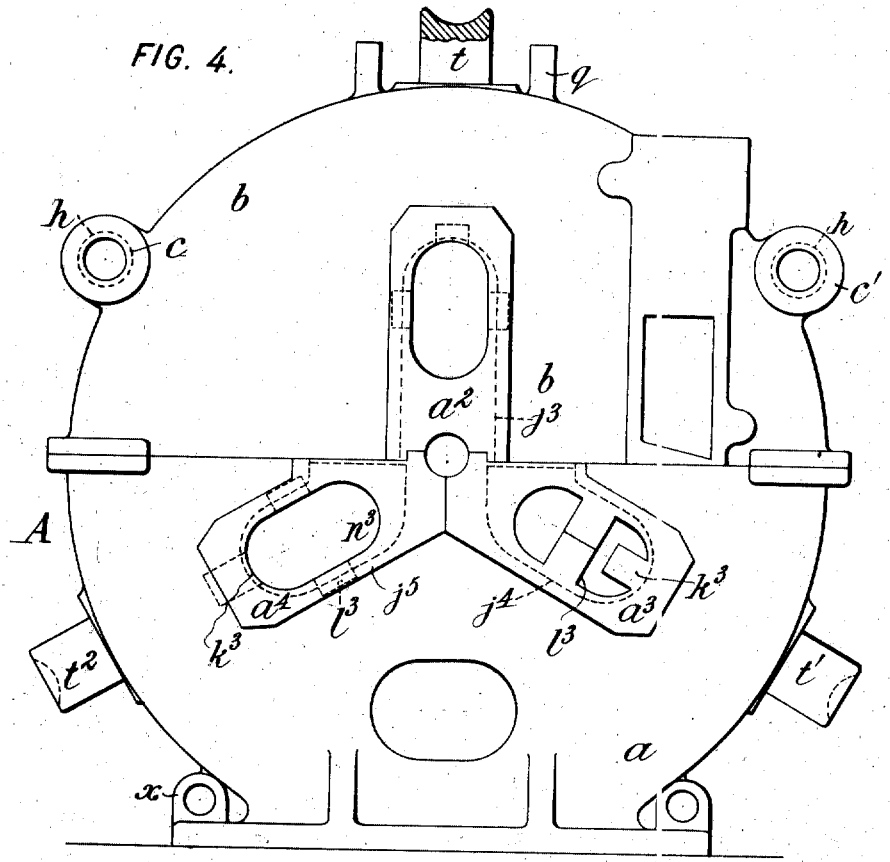

G. H. FRASER.
MACHINE FOR CRUSHING OR GRINDING.
APPLICATION FILED MAR. 16, 1905. RENEWED JULY 3, 1916.

1,222,382.

Patented Apr. 10, 1917.
5 SHEETS—SHEET 5.

WITNESSES:
Fred White
René Mines

INVENTOR:
George H. Fraser,
By Attorneys,
Arthur E. Fraser & Co.

UNITED STATES PATENT OFFICE.

GEORGE H. FRASER, OF BROOKLYN, NEW YORK.

MACHINE FOR CRUSHING OR GRINDING.

1,222,382.  Specification of Letters Patent.  Patented Apr. 10, 1917.

Application filed March 16, 1905, Serial No. 250,474. Renewed July 3, 1916. Serial No. 107,467.

*To all whom it may concern:*

Be it known that I, GEORGE H. FRASER, a citizen of the United States, residing in the borough of Brooklyn, county of Kings, city and State of New York, have invented certain new and useful Improvements in Machines for Crushing or Grinding, of which the following is a specification.

This invention relates to machinery for crushing, grinding or pulverizing materials, and aims to provide certain improvements therein.

The invention relates more particularly to rock crushers of the type having a plurality of crushing rolls within an annular die in which the crushing is effected between the periphery of the rolls and the inner face of the die. One example of this type of crusher is shown in the patent of H. L. Kent, granted May 7, 1901, No. 673,856, in which the die revolves and is held in position by the rolls, which latter are carried by shafts held in bearings at the outside of the casing, the bearings being carried by slideways and pressed outwardly by springs, so that the rolls may slide in and out radially of the ring. The top roll in this patent is shown as supporting the ring yieldingly, and the sliding frames carrying the shafts are of sectional construction, and both guide the shafts and transmit the crushing pressure from the springs to them.

My present invention aims to provide an improved crusher or pulverizer especially applicable to this general type.

To this end in carrying out my present invention in its preferred form, I provide an improved arrangement of die and rolls, improved means for carrying the roll shafts, improved means for guiding such shafts, means for transmitting all or part of the crushing thrust from one roll to another so as to relieve the bearing pressure or the spring pressure in whole or in part, an improved feed for automatically regulating the flow to the crusher, and various details of improvement in the construction and arrangement of the various parts of the crusher, all of which will be hereinafter more fully set forth with reference to the accompanying drawings, in which, Figure 1 is a fragmentary side elevation of a pulverizer embodying the preferred form of my invention, the view being partly broken away to show one of the yokes and the feeder in mid-section;

Fig. 4 is a fragmentary vertical section cut on the planes of the lines 4—4 in Fig. 3 and looking in the direction of the arrow, the yokes, springs and bearings being omitted for clearness;

Fig. 5 is a face view of one of the dust guards;

Fig. 6 is a face view of one of the dust plates;

Fig. 7 is a fragmentary section showing the dust guard and plate in position in edge view;

Fig. 8 is a fragmentary transverse section thereof on the line 8—8 of Fig. 7 and showing the dust guard in plan;

Figs. 9, 10, 11, 12 and 13 are diagrammatic views illustrating modifications of features of my invention.

Figure 1:
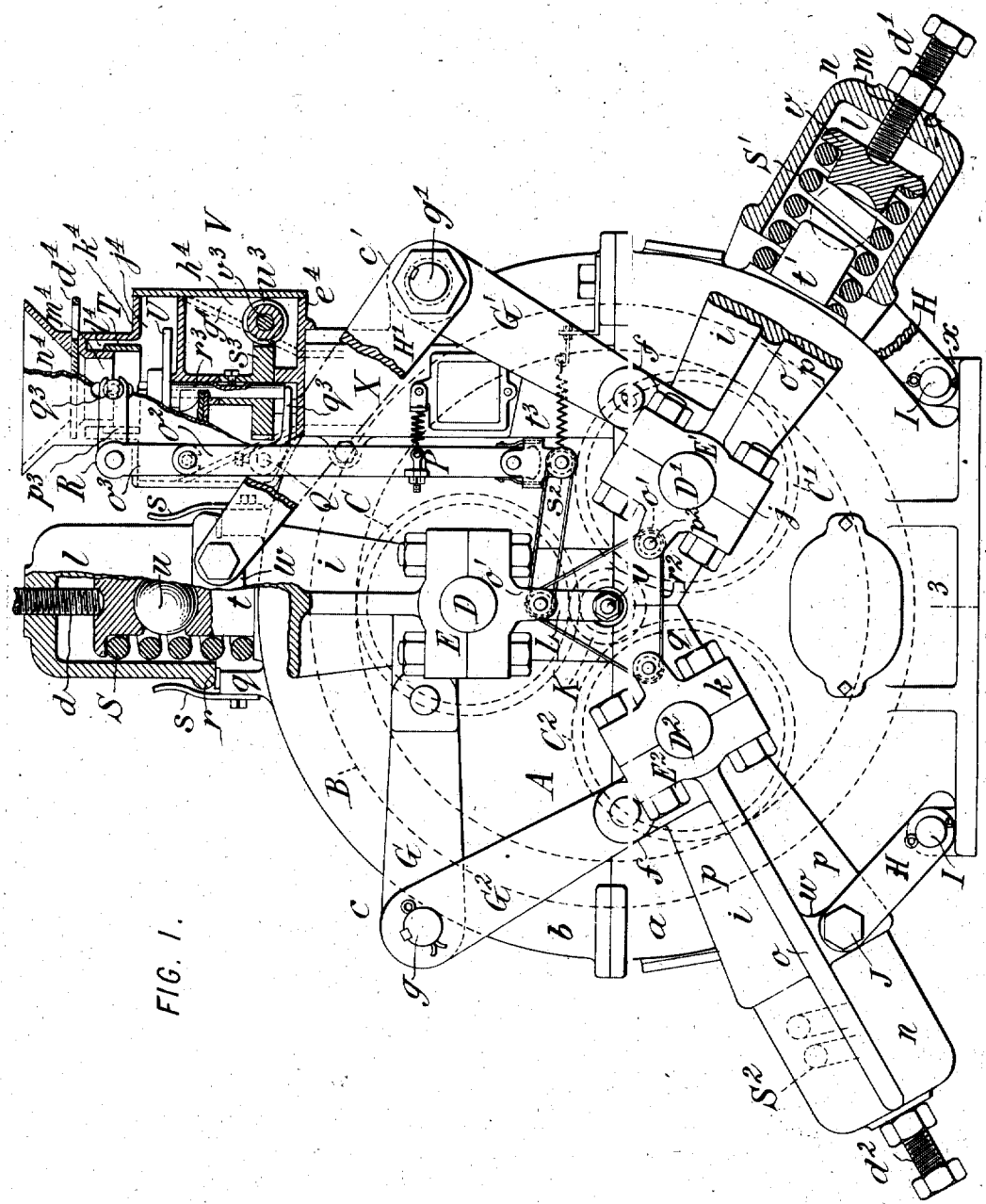

Referring to the drawings, A is the casing, B is the ring or die. C, C$^1$ and C$^2$ are the crushing rolls. D, D$^1$ and D$^2$ are their shafts. E, E$^1$ and E$^2$ are their bearings, S, S$^1$ and S$^2$ are the crushing springs, and $d$, $d^1$ and $d^2$ are adjusting screws.

The casing incloses the ring and rolls and supports them. The top roll in the construction shown carries the ring by acting against its inner face, and the other rolls press outwardly against the inner face to crush the rock between their peripheries and such face. Their pressure may be adjusted by the springs and adjusting screws. The ring and rolls are driven in any suitable manner, as by a driving pulley F on the shaft D for example. The feed delivers the rock on to the inner face of the ring, and the crushed rock flows off the sides of the ring and falls out through an opening $j^6$ in the bottom of the casing. The casing is made sectional to permit opening, as by being constructed as a base or bottom shell $a$ and a cover or top shell $b$.

I will now describe in detail the preferred form of my improvements as illustrated in the drawings.

According to one feature of improvement, I guide the bearings for the several shafts by a swinging guide or pivotal connection, so that each can oscillate relatively to a predetermined axis if its movement radially of the ring is necessary. I prefer to so guide each shaft bearing, and to carry all from one of the sections of the casing, preferably the top shell $b$, which for this purpose I provide with transverse bearings $c$ $c^1$, in which are mounted shafts $g$ $g^1$, the shaft $g$ being connected to the bearing E by links G on opposite sides of the casing, and by links $G^2$ to the bearing $E^2$, so that each of these bearings is supported pivotally from its center, and the shaft $D^1$ being connected by similar links $G^1$ to the bearing $E^1$. These connections permit the bearings to rock toward and from the center of the ring, but support them against thrusts in the direction of drive of the ring, as well as in case of the lower bearings carrying part of their weight. The links are connected to the respective bearings by pins $e$ traversing the ends of the links and holes in projections $f$ on the bearings. The links may be loosely connected to the shafts $g$ $g^1$, but I prefer to connect only the links G loosely, so that they can rock independently of each other, and to key or otherwise rigidly connect the links $G^1$ and $G^2$ to their shafts $g^1$ and $g$ respectively, so that these links and their shafts make a rigid frame extending around the casing, and insuring parallel movement of the bearings at opposite sides of the latter. This construction attains a more advantageous guidance of the roll shafts than heretofore, and provides a much simpler and more economical means for correctly guiding them. Where desirable, I form the transverse bearings for the guiding links with internal chambers $h$ which are filled with babbitt, for the transverse shafts $g$ $g^1$, and I extend these shafts beyond their bearings.

Figure 2:
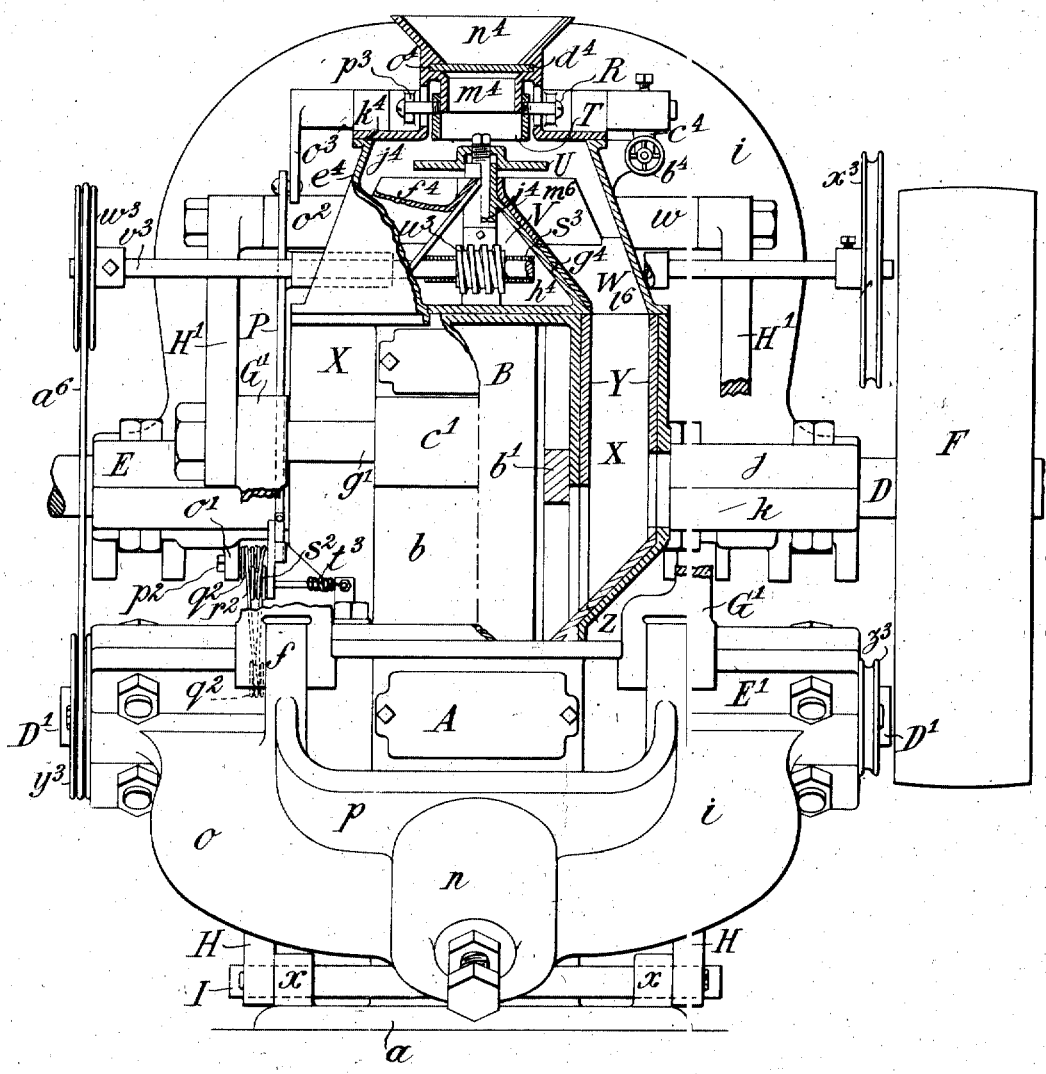
Fig. 2 is a front elevation thereof partly in vertical section.
Figure 12:
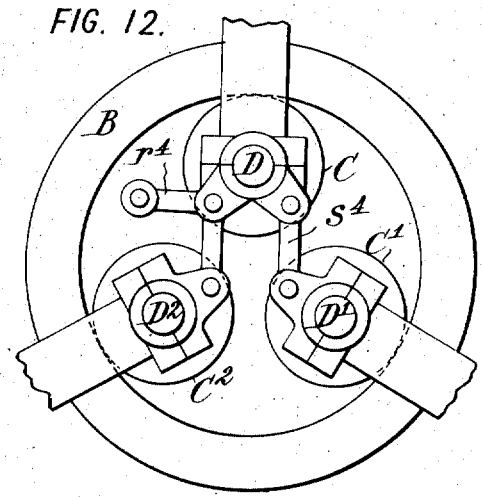
Figure 13:
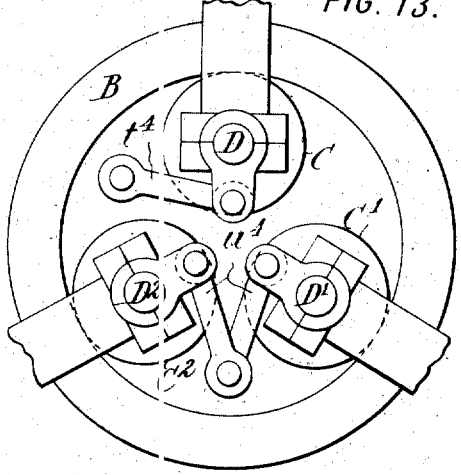

According to another feature of improvement, I provide a rigid bearing frame preferably consisting of a single U-shaped casting or yoke $i$ straddling the casing and receiving the ends of the shaft at opposite sides thereof, so that these ends are assured of parallel bearings, and the number of parts necessary is reduced to the minimum. The bearing end $j$ of each yoke is planed and covered by a bearing cap $k$, and the projections $f$ for the supporting links are preferably cast integral with the end of the yoke so as to support the bearing from the yoke instead of from the cap, although I may support it from the latter, as for example as illustrated in Figs. 12 and 13. Each yoke is a relatively heavy casting in order to give not only the strength necessary to rigidity, but the weight desirable to the necessary crushing pressure or inertia. Each yoke is preferably formed with a spring pocket $l$ for receiving the pressure spring, and has a screwthreaded aperture $m$ for the corresponding adjusting screw. The spring pocket is formed in a central enlargement $n$ on the outer side of the yoke, which is connected by a rib $o$ and side flanges $p$ with the bearing end $j$. The side flanges or legs of the yoke preferably converge toward the center as seen in Fig. 2.

According to another feature of improvement I preferably mount the top shaft fixedly against downward yield, but so it can be adjusted vertically and so it can move upwardly in case of abnormal stress. This is preferably accomplished by mounting the yoke of the top shaft bearing on fixed bearing portions $q$ provided on the upper part of the casing at or close to its opposite sides, which receive faces $r$ of the yoke and thereby support the latter from the casing at a fixed vertical position relatively to the latter, but without preventing any tendency of the yoke to lift, as the yoke is not fastened down on the bearing portions but merely rests thereon. These bearing portions are remote from the center, so that any tendency of the yoke to rock transversely of the casing is resisted by the fact that such rocking would necessitate that the yoke should lift off from one of the bearing faces in case it rocked on the other one. This provision is sufficient to keep the yoke in its normal position except under exceptional shock or strain, when it may move momentarily to avoid breakage.

Figure 3:
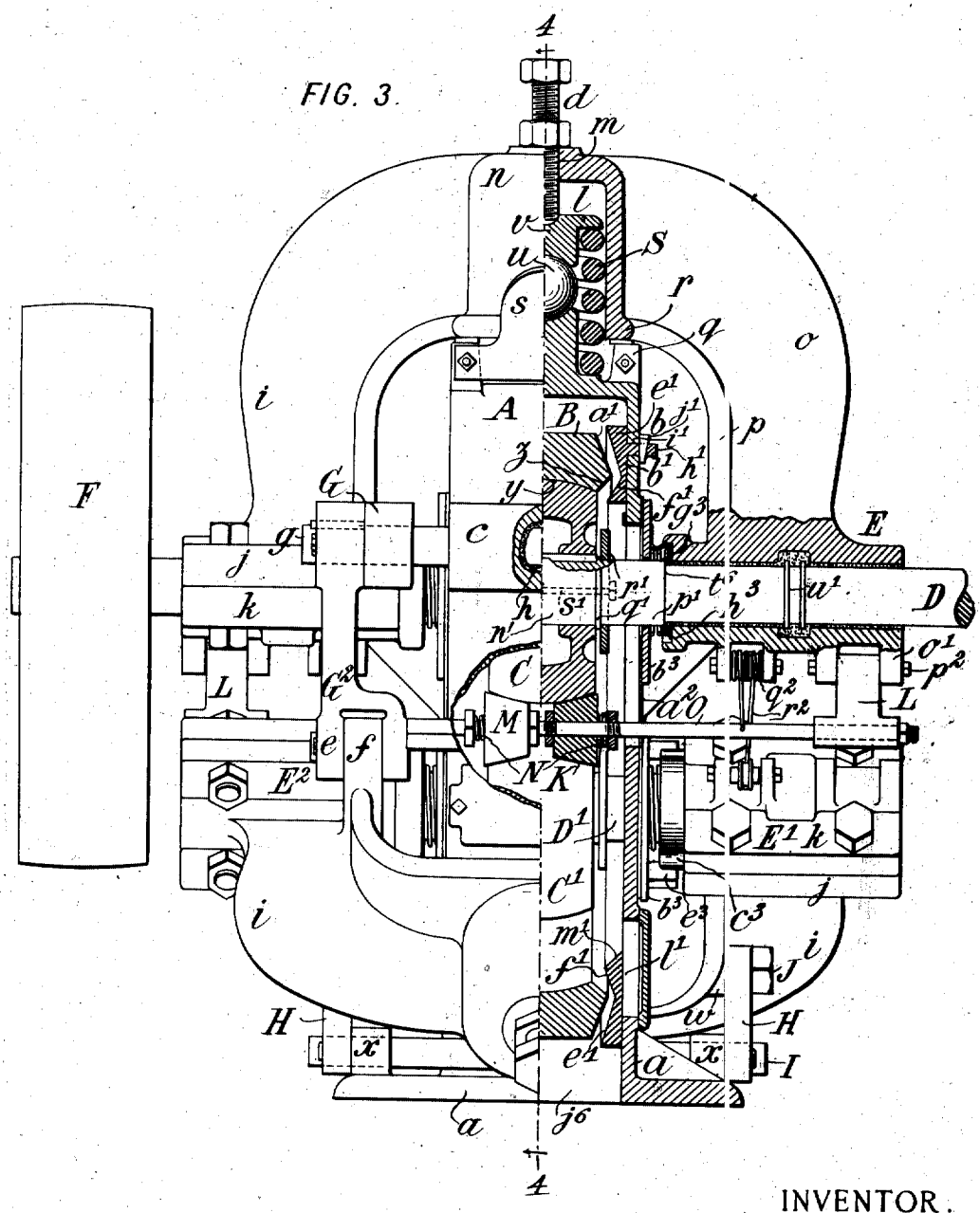
Fig. 3 is a rear end elevation thereof, partly in vertical section on the plane of the line 3 in Fig. 1.

To retain the top yoke against falling sidewise, I prefer to provide a guide carried yieldingly by the casing, as the upwardly projecting guide $s$ seen in Figs. 1 and 3. These guides loosely receive the yoke near its center and limit its motion in forward or rearward direction. For adjusting it vertically, I prefer to use an adjusting screw $d$ screwing into its spring pocket $l$, which screw may be adjusted directly or through suitable intermediate provisions to lift the yoke from the top casing. As shown, the casing is provided with a projection $t$, which is cylindrical and has a concave end, and a ball of lead or other material $u$ is set on this projection and carries a washer $v$ against which the screw $d$ acts. When the yoke is to be adjusted upward the screw will be used, and if the yoke is to be permanently raised and prevented from rocking on the ball, liners will be inserted between the yoke and the projections $q$ after the yoke has been raised to the desired position. The projection $t$ is similar to like projections $t^1$ and $t^2$ on the lower casing corresponding to the bearings $D^1$ and $D^2$, which projections on the lower casing are used as spring holding provisions for maintaining the spring in proper relation to the yoke in each instance. These are preferably long enough to support the outer end of the yoke through the medium of the spring, in case this is desired. The washer $v$ is identical with similar washers which are used between the adjusting screw and spring for each of the lower yokes.

Another feature of improvement consists in utilizing the weight of the lower yokes as an auxiliary means of generating crushing pressure. This I preferably accomplish by utilizing the angularity of the pivoted supports for the bearings, so that the weight carried by them tends to force the rolls outwardly against the inner face of the ring, and preferably also by supporting the outer ends of the lower bearings by pivotal connections so disposed that the tendency of these ends to fall under their weight is resisted by the pivotal support in such way as to use the latter in the nature of a toggle joint. As shown, this is done by supporting the outer end of each lower yoke by a link H, which is fulcrumed to the lower casing I and to the yoke at J, so that it movably supports this end of the yoke from the casing, and tends to move the end of the yoke outwardly as the outward end of the link is depressed. To carry the link H, the yoke is formed with ears $w$ between which the link is pivoted, and the base is formed with ears $x$ between which the link is pivoted.

The top yoke is also guided at its upper part by a link $H^1$ on each side, which extends from the shaft $q^1$ to the lug $w$, as seen in Figs. 1 and 2. These links $H^1$ may be used with the guides $s$ as shown.

In machines of this character the crushing pressure has been carried on the bearings. When the machine is empty, the rolls run directly against the face of the ring, but when material is fed on to the inner face the rolls are more or less separated from this face by the thickness of the layer of material being crushed which rests on the face. The greater this thickness the greater the crushing pressure to be resisted by the bearings. My invention provides means for relieving the bearings of part of this work, and means for transmitting the resistance of the work being done by one roll to the other rolls as a crushing force. I prefer to do this by interposing between the rolls or a part carrying them, an intermediate roll K against which the crushing rolls may run intermittently or continuously. While the intermediate roll K may be utilized as a driver for all the other rolls, I prefer to make it a mere idler as shown, carrying it on a light shaft supported by auxiliary bearings L from the cap of the top roll C, so that it is normally in contact with the latter and slightly out of contact with the two lower rolls, but in such position that it will be engaged by these in case either moves back a predetermined distance. In such case the intermediate roll will be poised between the three rolls so as to distribute to each an equal pressure, and will run as an idler or antifriction roll between them, transmitting the thrust of each to the others, and correspondingly relieving the bearings of each. The intermediate roll is shown in Figs. 1 and 3 as carried by a shaft O carried at its outer ends in hinged bearings L or otherwise freely mounted so that it can adapt itself to variations in the relative positions of the crushing rolls, and thus compensate for the lack of uniformity in their relative movement. It may be a single solid roll of suitable peripheral contour to properly coact with the portion of the other rolls, or their shafts, with which it contacts. I prefer to form it as a split roll in two halves each tapering toward the other, and pressed toward each other by springs, so that it may yield more or less if desirable. Its shaft is preferably small enough to flex slightly in order to enable it to yield in working. This intermediate roll greatly reduces friction and outside strains. This will be useful particularly where granulation and the avoidance of fines is desired.

That part of my invention which provides for mechanically transmitting the inward thrust of each roll to one or all the other rolls, or for definitely locating the rolls and ring as to clearance for the passage of material being crushed, makes it important to provide for uniformity of feed, and automatic regulation of feed, as by closely adjusting the feed and regulating it to the capacity of the machine the best results can be obtained. Therefore I provide an improved means for automatically regulating the feed of such machines, and I provide an improved feeder especially suitable to operation therewith.

In crushers of this type the ring is generally provided with a concave crushing face, and the rolls with convex faces. I may automatically control the feed in such a machine by my auxiliary roll K, which when subdivided and its two parts M are made of the proper taper to be reciprocal to the crushing faces of the crushing rolls, will be acted on by these rolls to separate its two parts against the resistance of their springs N on its shaft O as the crushing rolls move too close together. This spreading of the parts of the roll K may be transmitted through levers P fulcrumed on the upper casing at Q to the journal R of a controlling gate T, which is moved to restrict the feed as the parts of the roll K spread, and raised to increase the feed as they again resume the normal, thus automatically regulating the flow to the machine.

My invention provides an improved feed consisting of a revolving table or disk U in the feed hopper, and a worm-and-gear driving connection for this table which is driven from one of the roll shafts, and bifurcated spouts W for dividing the discharge between the two feed chutes of the crusher. The gate T is preferably a tubular part of the inlet of the hopper, and the disk U is mounted on a vertical axis concentric of the gate, so that the material flowing through the gate will spread on the disk and flow over the edges of the latter. The gate or the disk, or both, are adjustable to give the desired speed of flow when the gate is in mid position. As the gate is lowered it will restrict the speed of flow by diminishing the angle of the material on the disk, and when the gate is raised it will increase the speed of flow by increasing this angle. The material falling over the edge of the disk will roll down the inclined bottom of the hopper until it falls into the feed chute, and will fall through these chutes and be deflected into the machine on the inner surface of the ring. The driving gear V for the feed is shown as a worm gear on the shaft of the disk meshing with a worm carried by a transverse shaft which is driven by a pulley the belt of which is driven by a pulley on the feed shaft $D^1$ of the mill.

The feed chutes X are separate pieces bolted to the sides of the casing A, and are provided with the movable tubular linings Y which protect them from wear, and with removable deflecting plates Z at their bottoms which project into the shell for guiding the material within the ring.

The ring B is of improved construction, in that its annular concave crushing face or track $y$ is flanked by an outwardly tapering projecting portion $z$, beyond which it has a sharp inwardly tapering portion $a'$. The outward projection $z$ reinforces the edges of the ring and prevents the metal at this point from running over or breaking off, and the receding side walls $a'$ lighten the weight of the ring while increasing the clearance between its sides and the casing, so that material passing the projection $z$ may easily escape into the casing.

The cheek pieces $b'$ on the inner wall of the casing to protect it from contact with the ring B, are formed with a tapering face $e'$ opposite the face $a'$ of the ring, and with a reverse tapered face $f'$ opposite the projection $z$ of the ring. The face $f'$ is a relatively greater distance from the ring than is the face $e'$, so that the latter will receive the rub of the ring, and any wear caused thereby will be on the outer portion $a'$ of the ring, and will not reduce the effective width of its crushing face. The reverse face $f'$ tends to deflect inwardly on to the ring any large pieces which do not pass out between the ring and roll at top. The top cheek piece is formed with an integral lug $h'$ at one or more points on its outer face, these lugs passing through apertures $i'$ in the casing, and being held therein by wedges $j'$ passing through holes in the lugs, as best seen in Fig. 3. The lower cheek pieces $b'$ have similar lugs likewise passing through apertures in the casing and fastened by wedges or other suitable provisions, and on their inner faces these pieces have the wide inclined contact faces $e'$ and the narrow reverse angle faces $f'$ overhanging the projections $e$ of the ring, and inwardly thereof a beveled face $m'$ which serves to deflect back on to the ring any material tending to fall down between the inner wall of the casing and the ring.

The shaft D is of improved construction in that it has a roll seat $n'$ of large diameter, reduced bearing ends $p'$ at each side thereof, and an integral projecting shoulder $q'$ between said seat and one of said ends, against which shoulder the roll C is driven, a collar $r'$ fitting over the reduced end of the shaft, and against the shoulder $q'$, which collar is traversed by bolts $s'$ passing through the roll and engaging one face thereof, and through the collar and engaging the outer face thereof, so that the roll and collar are drawn against the projecting intermediate shoulder, and motion of either axially of the shaft is prevented. Outwardly of the shell the shaft has a shoulder $t^6$ where it enters the bearing E, and within the bearing it has one or more projecting shoulders $u'$. The drive shaft D and the shaft D' project beyond the bearing, but the ends of shaft $D^2$, which are plane within their bearings, thrust against a loose thrust-disk $v'$ set in a pocket $w'$ in the end of the bearing, see Fig. 9. The bearing is formed with a central cavity $x'$ to make room for the babbitt to flow around the shoulders $u'$.

I provide an improved dust guard for closing the casing around each driving shaft. This consists of a sheet metal plate $a^2$ for the top shaft, $a^3$ for the front shaft, and $a^4$ for the rear shaft, and a disk $b^3$ which is supported by lips $c^3$ on the bearing cap, and has a central aperture fitting around the shaft. The disk $b^3$ has a leaf spring $d^3$ engaging the bearing frame and tending to force the disk toward the cap, and has projections $e^3$ engaging the lips on the cap. A spring $f^3$ surrounding the shaft forces the disk away from the bearing and toward the plate on the casing. This spring reacts against a dust ring $g^3$ which fits on the shaft overhanging the shoulder $t^6$ thereof, and fits within a pocket $h^3$ in the bearing to keep dust from blowing into the latter. The disk $b^3$ has an annular chamber $i^3$ surrounding the shaft to catch outwardly blowing dust and deflect it laterally of the shaft. The plates $a^2$ $a^3$ and $a^4$ are shaped to cover the shaft slots $j^3$ $j^4$ $j^5$ in the casing, and have integral hooks bent inwardly around the walls of these slots to hold the plates in position.

The plate $a^2$ has a hook $k^2$ at its upper end which prevents its lifting, near its middle side hooks $l^2$ which hold it sidewise, and at its lower end a bottom hook $m^2$ which crosses the bottom of the slot $j^3$, and laps over top hooks $m^3$ of the plates $j^4$ and $j^5$. The lower plates have hooks $k^3$ at their outer extremities, side hooks $l^3$ near their middles, and the top hooks $m^3$. All the plates have a central opening $n^3$ for passing the corresponding shaft. The disk $b^3$ is large enough to cover this opening in all normal positions of the shaft it is carried by.

In operation, the ring and rolls will be driven to make the side of the ring near the feed end of the casing move in a downward direction, and at sufficient speed to cause the material to be crushed to be held on the inner face of the ring by centrifugal force. The feed will enter through the chutes, fall on to the inner face of the ring, and be crushed as it passes the rolls. The speed of feed will be adjusted to approximately maintain a predetermined depth of material on the inner face of the ring, and then the automatic feed controller will be adjusted to operate with variations of this feed, as explained. If the machine is to run without using the intermediate roll K, the latter will be adjusted out of action or removed, and the weight of the crushing parts alone, or the tension of the crushing springs alone, or both combined, will be used to produce the crushing power.

The plates $a^2$ $a^3$ $a^4$ are passed over the ends of their respective shafts, and then the disks $b^3$ are passed over the shafts against the outside of the plates, after which a spring $f^3$ is passed over the adjacent end of each shaft against the disks. The hooks of the plates are then engaged with the walls of the casing to hold the plates in position, and when the shafts are dropped in the bearings the springs $f^3$ are pressed into the space between the bearings and the casing, so that they will press the disks against the plates. The disks are turned so that their projecting fingers $e^3$ will embrace the bearing end $j$ of the adjacent bearing yoke and guide the disks laterally of the yoke, so that they will be supported by the projecting lugs $c^3$ of the cap $k$. The free end of the spring $d^3$ is entered into the recess in the end of the bearing $j$ so that it will press the disk toward the cap. The disk is thus supported by the cap through the fingers $e^3$, and by the yoke through the spring $d^3$, so that the disk will follow the movement of the yoke radially of the ring, and will be pressed tightly against the sides of the casing so as not to participate in movements of the shaft axially. The disk makes a fairly close fit around the shaft, and interferes with the blowing out of dust or chips through the adjacent slot in the casing. Any dust outside of the disk that might enter the bearing along the shaft, is intercepted by the ring $q^3$, which is pressed against the bearing by the spring $f^3$ so that it does not participate in movements of the shaft axially. As the shaft wears into the cap in use, the ring $q^3$ follows the shaft and thus serves to close ingress to the bearing at its slack side.

While as before stated I may control the automatic feed by means of the thrust roller K when this is a divided roller, I prefer to utilize the relative movement of the crushing rolls independently of the thrust roller for automatically regulating the feed. This may be variously done, but I prefer the simple expedient shown in Figs. 1 and 2, which consists in a connection between the various rolls for transmitting their motion radially of the ring to the feed regulating mechanism. As shown, each bearing cap $k$ is provided with a plurality of lugs $o^1$, those of the bearing E carrying the supports L for the shaft O of the thrust roll near the outer end of the bearing, and those of all the bearings at one side of the machine carrying shafts or bolts on which are mounted pulleys $q^2$, around which a rope belt $r^2$ passes, which is preferably endless and passes around a pulley $s^2$ on the end of the lever P in such manner that as the crushing rolls move toward each other with increase of material on the inner face of the ring, the belt will be slackened and permit the lever P to tilt outwardly on its fulcrum Q, and as the crushing rolls separate the belt will be tightened and draw the lower end of the lever inwardly. The pulley $s^2$ may be mounted with a slight lost motion, as shown, and held in its mid position elastically, so that the lever P will not participate in all vibrations of the rolls, but will only be operated by relatively extensive movements thereof. The lever is kept under the tension of a spring $t^3$ adjustably mounted and tending to draw its lower end outwardly, so that it responds instantly to slackening of the belt $r^2$, and yields as the latter is tightened, thus insuring that it corresponds accurately in its movements to any relative movements of the crushing rolls. Above its fulcrum the vertical short arm $c^2$ of the lever P has a pin which engages the arm $o^3$ of the lever R, which latter has short arms $p^3$ engaging pins $q^3$ carried by the gate T. As the lower end of the lever P swings away from the center of the machine, it acts through the lever R to lower the gate T, which diminishes the feed. When the crushing rolls move away from each other and thus cause the lower end of the lever P to swing inwardly, it tilts the lever R in the opposite direction and raises or further opens the gate T, thus increasing the speed of feed. From this it will be seen that the feed is automatically diminished as the crushing rolls are forced toward each other by the quantity of material within the machine, and increased as these rolls recede from each other. By proper proportioning and correct adjustment, the machine can be set to automatically regulate its feed very closely.

While this regulation may be applied to any feed gate or to any revolving feed member, I prefer in the construction shown to apply it to both the gate and the revolving member, as thereby the extent of adjustment in proportion to the movement of the crushing rolls is greatly increased. This I accomplish in the construction shown by connecting a lever $q^3$ to the lever P, and supporting the disk U on this lever $q^3$, so that the disk will be raised and lowered with the outward and inward swinging of the lower end of the lever, the movements of the disk being in opposition to those of the gate T, so that the diminishing and increasing effects are correspondingly more pronounced.

As shown, the disk U is adjustably screwed on the upper end of a shaft $r^3$, the lower end of which shaft passes through the worm gear $s^3$ and rests on the end of the lever $q^3$. The worm gear is feathered to this shaft so that the shaft can rise and fall through the gear, but must rotate with it. The worm $u^3$ is fixed on its shaft $v^3$, which projects at its ends and carries differential pulleys $w^3$ $x^3$, the one being over a pulley $y^3$ on one end of the shaft $D^1$ of the feed roll, and the other being over a pulley $z^3$ on the other end of such shaft. A belt $a^6$ tracks on the pulleys at one side or the other of the machine, according to the speed desired for the worm shaft, and drives the latter from the shaft of the crushing roll $C^1$. In this manner the drive of the feeder accords with the motion of the feed roll, so that should the latter be stopped, the motion of the feed will be stopped. This is important, as the feed roll is the one most liable to slip or stoppage, and sometimes the drive roll continues to move independently of or faster than the feed roll. In the machine shown, traction is relied on for driving the lower crushing rolls, and the ring is driven by traction from the top roll, so that it will be apparent that there may be variations in the relative movements of the several shafts.

In adjusting the feed, I prefer to choose the normal position of the gate T and disk U, and then set the automatic controlling device to shift them relatively to the positions chosen for them. To this end the gate T is set in any suitable manner, as by the hand screw $b^4$, before the short arm $o^3$ of its lever is locked to the shaft on which it is fulcrumed; when the gate is properly set, and the short arm $o^3$ is set to operate it, the hand screw will be screwed back out of operation, or its lever $c^4$ will be loosened so that the gate may operate independently of it. The disk U is raised to the desired position, and then the lever $q^3$ is set on the shaft Q, after which regulation will continue automatically until there is reason for again adjusting the speed of feed. A sliding shut-off gate $d^4$ is provided above the movable gate T.

The feeder itself is of improved construction, consisting of a shell $e^4$ having bifurcated inclined chutes $f^4$, a subdividing deflector $g^4$, a gear chamber $h^4$, a tubular bearing portion $i^4$, and an upper feed chamber $j^4$ which is closed by a cover $k^4$ having an annular gate wall $l^4$ opening into the chamber $j^4$, and an integral annular spout $m^4$ within this chamber, and a flaring hopper $n^4$ above this spout with a track $o^4$ between the hopper and spout for the sliding gate $d^4$. The gate T is tubular and surrounds the chute $m^4$, moving up and down in the well. The pins which connect the lever R with the gate, pass through slots in the cover. The disk U has a central cavity on its under side fitting over the upper end of the bearing $i^4$, and preventing dust falling into the gear chamber. The rear wall of the feed casing is solid, and the front wall is open and is closed by a cover so that the gear chamber is closed against ingress of dust.

In operation, when the top roll is mounted fixedly against downward movement but free to move upwardly, it will be adjusted vertically to the desired position, then suitable liners will be placed on the rests for supporting it. The other rolls will be pressed against the ring by their weight acting through their swinging supporting links or the toggle links H, or both, or by their pressure springs, as desired. The direction of drive of the top shaft will be such that the top of the ring will move toward the feed roller $C^1$. Feed will be delivered by the feeders through both feed spouts, and will be discharged on the inner face of the ring in front of the feed roll. The material fed will travel around with the ring and be crushed as it passes the rolls. The latter will move inwardly and outwardly according to the depth of material on the inner face of the ring, and will follow the movements of the ring. The speed of feed will be suitably adjusted, the gate $d^4$ being fully opened and the adjustment being made by the gate T or the disk U. The automatic feeding mechanism will then be set to vary the feed as required. In case of an unusually heavy feed, the rolls will move toward each other until the thrust roll K is in contact with the other three rolls, whereupon the thrust roll will revolve with them and transmit much of the thrust from each to the others, correspondingly relieving the shaft bearings of pressure. As the ring lowers with wear of the top roll, the top yoke will be moved upwardly by its adjusting screw. The two parts of the thrust roll will be adjusted inwardly to make up for wear on the other rolls. The thrust roll will bear on the edges of the other rolls, instead of on their centers, as the edges are less liable to wear than is the middle part of each roll.

It will be seen that my invention provides improvements which can be variously and advantageously availed of, and it will be understood that the invention is not limited to the particular combination of features and details of construction or arrangement herein described as constituting its preferred form, but that it can be employed in whole or in part according to such modifications as circumstances or the judgment of those skilled in the art may dictate, without departing from the spirit of the invention.

Figure 10:
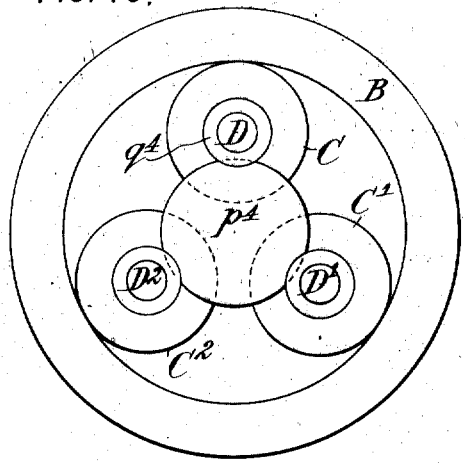

One modification is illustrated in Fig. 10, in which the thrust roll is an outside disk $p^4$ engaging projecting hubs or spindles $q^4$ on the other rolls.

Figure 11:
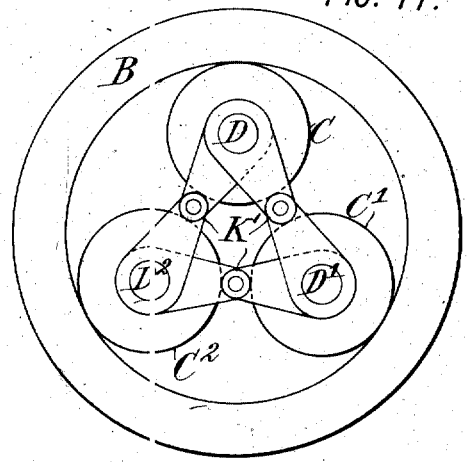

In Fig. 11 a modification is shown in which three thrust rolls K' are used, one between each of the crushing rolls, and all rolls are connected by links.

Another modification is shown in Fig. 12, in which the top yoke is yieldingly mounted and guided by a swivel link $r^4$ engaging its bearing caps, and carries the two lower rolls by swivel links $s^4$ depending from its bearing cap and connected to the bearing caps of the lower rolls, so that the thrust of each lower roll is transmitted to the top roll through the links and bearing caps, instead of through the intermediate thrust roll.

Fig. 13 shows a modification in which the top roll is guided by a link $t^4$ having a fulcrum above the center of the ring, and the lower rolls are guided by links $u^4$ having fulcrums below such center.

Figure 14:
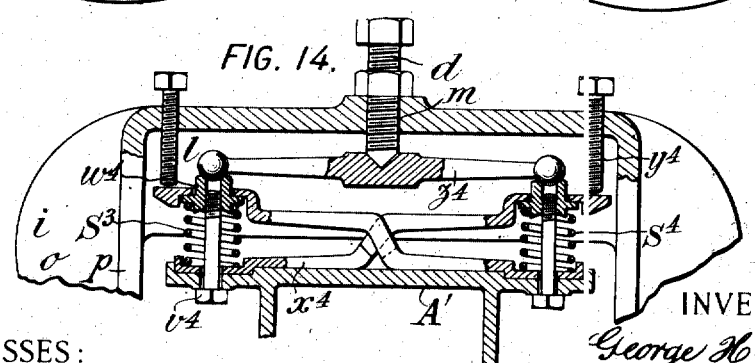
Fig. 14 is a fragmentary section of the shell and yoke showing a modification of the spring devices.

Fig. 14 shows a modification in which two springs $S^3$ and $S^4$ are used for each yoke, the springs being widely separated and clamped at predetermined pressures by bolts $v^4$ and spring buttons $w^4$ against the ends of the levers $x^4$ resting on the casing A', the free end of each lever embracing the spring button of the spring engaging the clamped end of the other lever, and the yoke being provided with a bearing or screw $y^4$ opposite the free end of each lever, so that when the yoke rocks in one direction this bearing screw will contact with the adjacent free end of one lever and tilt it so as to press both springs $S^4$, thus utilizing the tension of both springs to prevent rocking of the yoke. In this construction the adjusting screw $d$ of the yoke acts against the center of a bar $z^4$ the ends of which bear on the spring buttons, so that the tension of the springs is transmitted to the center of the yoke, irrespective of their relative adjustment, and there is no tendency of the springs to tilt the yoke.

For the purpose of more completely disclosing the scope and applicability of the features incident to this invention which I prefer to claim in this application many features of improvement in crushing and grinding machinery are herein shown and set forth but not specifically claimed in this application, being the subject matter of claims in my applications Serial Numbers 36,964, filed June 29, 1915, 36,965, filed June 29, 1915, 36,966, filed June 29, 1915, 145,690, filed Jan. 31, 1917, and 146,221, filed Feb. 2, 1917, which are divisional applications of which this is the parent case.

What I claim is:—

1. In combination, an annular crushing die revolving in an approximately vertical plane and having an internal crushing face, a movable and rotatable crushing roll within, eccentric to and disposed near the upper part of said die, having a crushing face reciprocal to that of the latter, means for revolving one of said parts, a non-rotative pivotally mounted member on which said roll is mounted, and means below the axis of said roll for pressing said roll upwardly to resist a crushing pressure from the inner face of said die.

2. In combination, an annular crushing die revolving in an approximately vertical plane having an internal crushing face, a movable and rotatable crushing roll within and eccentric to, and disposed near the upper part of said die, having a crushing face reciprocal to that of the latter, means for revolving one of said parts, a non-rotative movable member on which said roll is mounted, and means at the side of said roll for supporting and pressing said member upwardly to resist a crushing pressure from the inner face of said die.

3. In combination, an annular crushing die revolving in an approximately vertical plane and having an internal crushing face, a movable and rotatable crushing roll within, eccentric to and disposed near the upper part of said die, having a crushing face reciprocal to that of the latter, means for revolving one of said parts, a movable member on which said roll is mounted, and movable means crossing said die and rotatively carrying said roll therein, and means at each side of said roll for pressing it upwardly to resist a crushing pressure from the inner face of said die.

4. In combination, an annular crushing die revolving in an approximately vertical plane and having an internal crushing face, a movable and rotatable crushing roll within, eccentric to and disposed near the upper part of said die, having a crushing face reciprocal to that of the latter, means for revolving one of said parts, a movable member on which said roll is rotatively mounted, and means inwardly of said die for pressing said roll upwardly to resist a crushing pressure from the inner face of said die.

5. In combination, an annular crushing die revolving in a vertical plane and having an internal crushing face, a movable and rotatable crushing roll within, eccentric to and disposed near the upper part of, said die, having a crushing face reciprocal to that of the latter, means for revolving one of said parts, a non-rotative movable member carrying said roll, and means below said roll for pressing said roll upwardly toward said die to resist a crushing pressure from the inner face of the latter.

6. In combination, an annular crushing die having an internal crushing face, a movable and rotatable crushing roll within and eccentric to said die and having a crushing face reciprocal to that of the latter, means for revolving one of said parts, a non-rotative movable member on which said roll is rotatively mounted, and pressing means disposed inwardly of the axis of said roll and serving to press said roll upwardly toward the inner face of said die to resist a crushing pressure from the inner face of the latter.

7. In combination, an annular crushing die revolving in a vertical plane and having an internal crushing face, a plurality of movable rotatable crushing rolls within and eccentric to said die, said rolls movable toward and from one another and each having a crushing face reciprocal to that of said die, means for revolving one of said parts, non-rotative swinging carriers for said rolls respectively, and means intermediate of said carriers, pressing said rolls apart to generate a crushing pressure toward the inner face of said die.

8. In combination, an annular crushing die revolving in a vertical plane and having an internal crushing face, a rotatable roll within, eccentric to, and near the upper part of, said die, two rotatable and movable crushing rolls below said roll and within and eccentric to said die and each having a crushing face reciprocal to that of the latter, means for revolving one of said parts, non-rotative movable carriers for said lower rolls respectively, and means intermediate of said carriers and acting outwardly toward and holding said rolls toward said die to resist a crushing pressure from the inner face of the latter.

9. In combination, an annular crushing die revolving in an approximately vertical plane and having an internal crushing face, a movable and rotatable crushing roll within, eccentric to and disposed near the upper part of said die, having a crushing face reciprocal to that of the latter, means for revolving one of said parts, a non-rotative member on which said roll is rotatively mounted, and swinging means beneath said member for pressing said roll upwardly to resist a crushing pressure from the inner face of said die.

10. In combination, an annular crushing die revolving in an approximately vertical plane and having an internal crushing face, a movable and rotatable crushing roll within and eccentric to said die and having a peripheral crushing face reciprocal to the crushing face of the latter, means for revolving one of said parts, a non-rotative movable member on which said roll is rotatively mounted, and means adjustable in a direction substantially longitudinally of the axis of said die for holding said roll outwardly toward the inner face of the latter to resist a crushing pressure from the inner face of said die.

11. In combination, an annular crushing die having an internal crushing face, a movable and rotatable crushing roll within and eccentric to said die and having a peripheral crushing face reciprocal to the crushing face of the latter, means for revolving one of said parts, a non-rotative movable member on which said roll is rotatively mounted, and means holding said roll outwardly toward the inner face of said die to resist a crushing pressure therefrom and reacting in a direction substantially parallel with the axis of said die.

12. The combination with a revolving annular die and a crushing roll therein, of a casing for said parts, a bearing frame extending across said die and having bearings for said roll at opposite sides, pressing means disposed inwardly of the axis of said roll for pressing said roll obliquely downwardly and outwardly, and a toggle support for said frame normally tending to force said roll against said die.

13. In combination, an annular crushing die revolving in an approximately vertical plane and having an internal crushing face, a movable and rotatable crushing roll within, eccentric to and disposed near the upper part of said die, having a crushing face reciprocal to that of the latter, means for revolving one of said parts, a movable member on which said roll is rotatively mounted, and means below said member and acting divergently upwardly for pressing said roll upwardly to resist a crushing pressure from the inner face of said die.

14. In combination, an annular crushing die having an internal crushing face, a movable and rotatable crushing roll within and eccentric to said die and having a peripheral crushing face reciprocal to the inner face thereof, means for revolving one of said parts, a non-rotative movable member on which said roll is rotatively mounted, and means pressing said roll outwardly toward the inner face of said die to resist a crushing pressure therefrom comprising a spring or springs reacting in a direction substantially parallel with the axis of said die.

15. The combination with a revolving annular die of a roll therein carrying said die and mounted on an axis fixed against downward movement and free to move upwardly, lower crushing rolls within said die, a casing inclosing and movably supporting said parts, bearings for said lower rolls at the opposite sides of said casing free to move inwardly and outwardly relatively thereto.

16. In combination, an annular crushing die revolving in an approximately vertical plane and having an internal crushing face, a movable and rotatable crushing roll within and eccentric to said die and having a peripheral crushing face reciprocal to the inner face thereof, means for revolving one of said parts, a non-rotative pivoted member on which said roll is rotatively mounted, elastic means reacting in a direction substantially longitudinally of the axis of said die, and means whereby the stress of said elastic means is transmitted to press said roll outwardly toward the inner face of said die to resist a crushing pressure from the inner face of the latter.

17. In combination, an annular crushing die having an internal crushing face, a plurality of rotatable crushing rolls within and eccentric to said die and each having a peripheral crushing face reciprocal to the crushing face of said die, one of said rolls movable toward and from another of said rolls, means for revolving one of said parts, carrying means on which said rolls are rotatively mounted respectively, movable the one toward and from the other or others, and movable means between said carrying means for pressing said rolls away from one another to resist a crushing pressure from the inner face of said die, said movable means reacting outwardly relatively to two or more of said rolls and serving to communicate the inward pressure or stress of one to the other or others.

18. The combination with an annular die and three or more separated crushing rolls within and pressing outwardly toward the inner face thereof, of means for driving one of said parts relatively to the others, and a thrust member between said crushing rolls transmitting the radial thrust of each to the others.

19. The combination with an annular die and three separated crushing rolls within and pressing outwardly toward the inner face thereof, non-rotating bearings carrying said rolls, means for driving one of said parts relatively to the others, and a thrust roll between said rolls.

20. The combination with an annular die, a roll therein, and two separated movable rolls therein, and means for driving one of said parts relatively to the others, of a movably mounted roll disposed substantially centrally of said die between said movable rolls and radially transmitting the thrusts thereof to each other.

21. The combination with a revolving annular die and a plurality of crushing rolls therein, and means for driving one of said parts relatively to the others, of a feeder for feeding material to be crushed on to the inner face of said die, and means automatically regulating the speed of feed in accordance with the position of said rolls within said die.

22. The combination with an annular die and a plurality of separated crushing rolls therein, disposed around the center thereof of a yieldingly mounted roll between said rolls for transmitting the radial thrust from one to the other.

23. In combination, a revolving annular crushing die having an internal crushing face, a plurality of rotatable coöperating crushing rolls movable relatively and as a group within and eccentric of said die and each having a peripheral crushing face acting outwardly against the inner face of said die, means for revolving one of said parts, movable non-rotative pivotally mounted means carrying said rolls, and means disposed intermediate of said rolls, re-acting outwardly toward and pressing two or more thereof away from one another with a force that is countervailing in both directions, transmitting the inward pressure of one to another.

24. The combination with a revolving die, a yieldingly mounted roll therein, the one movable substantially radially of the other, and feed mechanism for feeding material on to the inner face of said die consisting of a tubular spout, a disk opposite said spout, and a chute leading from said disk to the inner side of said die, of means for adjusting said spout in accordance with the position of the movable one of said parts.

25. The combination with a revolving die, a yieldingly mounted roll therein, the one movable substantially radially of the other, and feed mechanism for feeding material on to the inner face of said die consisting of a tubular spout, a disk opposite said spout, and a chute for directing feed from said disk into said die, of means for adjusting said disk in accordance with the position of the movable one of said parts.

26. The combination with a revolving an-

...lar die, a movable roll yieldingly mounted therein and revolving on a horizontal axis, means for pressing it radially toward its working position, and a feed for feeding material to said roll, of means operated by the movement of said roll for regulating the feed according to the position of the roll.

27. The combination with a revolving die, a plurality of rolls therein, one of said rolls driven therefrom by traction, means for driving said die, and means for feeding material onto the inner face of the die in front of the roll therein driven by traction, of a driving connection between said roll and said feeding means for driving the latter from such roll.

28. The combination with a revolving die and a plurality of relatively movable revoluble rolls therein, of a feeder for feeding material to said die, and means automatically regulating the operation of said feeder and operated by relative movement of said rolls toward and from each other.

29. The combination with a revolving annular die and a plurality of relatively movable revoluble crushing rolls and a feeder for such rolls, of means adjusted by the relative movement of such rolls toward and from each other, and a disk in said feeder moved by such means.

30. The combination with a revolving annular die and a roll within and supporting said die, of a shell inclosing said parts and having a plurality of fixed bearing faces on its upper portion, a bearing frame crossing the top of said shell having bearings for said roll at opposite sides of said shell, and having an intermediate portion crossing said shell and resting on said fixed bearing portions.

31. The combination with a revolving annular die and a roll within it, of a shell inclosing said parts and having outwardly projecting portions on its outer edge between its sides, and a bearing frame crossing the outer edge of said shell and having bearings for said roll at opposite sides of said shell, and having an intermediate portion supported from said shell and means carried by said shell for supporting said frame so that it can oscillate relatively thereto.

32. The combination with a revolving annular die and a roll within it, of a shell having an outwardly projecting leaf-spring, a bearing frame having bearings for said roll at opposite sides of said shell, and having an intermediate portion crossing said shell and guided relatively thereto by said spring.

33. The combination with a revolving die and a roll therein, of a shell inclosing said parts and having an external substantially radial projection, and a bearing frame having bearings for said roll at opposite sides of said shell, and having an intermediate portion crossing said shell and having a chamber opposite and inclosing said projection and means for supporting said frame from said shell so that said frame can oscillate.

34. The combination with a revolving die and a roll therein, of a shell inclosing said parts, a frame crossing said shell and having bearings for said roll at opposite sides thereof, pressing means disposed inwardly of the axis of said roll for pressing said roll obliquely downwardly and outwardly, a link pivoted to said shell and engaging said frame at one side thereof, and a second link pivoted to said shell and engaging said frame at the other side thereof.

35. The combination with a crushing roll, of a revolving annular die having an internal track opposite and surrounding said roll, outwardly projecting portions at opposite sides of said track, and inwardly inclined sides, and pressing means disposed inwardly of the axis of said roll for pressing said roll obliquely downwardly and outwardly.

36. The combination with an internal revolving crushing roll, an annular revolving die surrounding said roll having an internal track bearing against and coacting therewith, and having outwardly flaring side faces, and a shell inclosing said parts, of a cheek-piece within said shell at each side of said die having an outwardly inclined face opposed to said die.

37. The combination with a revolving annular die having an internal track and inwardly inclined sides, a crushing roll within and supporting said die and acting yieldingly against said track, and a shell inclosing said parts, of a cheek-piece within said shell at each side of said die and having an inwardly inclined face opposite said die.

38. The combination with a shaft having a roll seat and an outwardly projecting shoulder at one side of said seat, of a crushing roll having a central bore fitting said seat at one side of said shoulder and having transverse holes outwardly of said bore, a collar fitting on said shaft at the other side of said shoulder, and bolts traversing said holes and said roll and clamping it and said collar against said shoulder.

39. The combination with a crushing roll of a shaft therefor having a shoulder $t^u$ and a reduced bearing portion beyond said shoulder, a bearing embracing said bearing portion, and a ring rotatively mounted on and surrounding said shaft overhanging said shoulder and closing the space between said shoulder and said bearing.

40. The combination with a crushing roll, a horizontal shaft therefor, a casing inclosing said roll and having a slot for said shaft, a movable bearing for said shaft outside of said casing, a dust guard surrounding said shaft and carried by said bearing, and a spring surrounding said shaft between said bearing and dust guard pressing said dust guard toward said casing.

41. The combination with a crushing roll, a shaft therefor, a casing inclosing said roll and having a slot for said shaft, a bearing for said shaft outside of said casing, of a dust guard surrounding said shaft and having fingers resting on said bearing, and a spring between said bearing and guard, reacting against them transversely of said shaft and pressing said fingers toward said bearing.

42. The combination with a crushing roll, a shaft therefor, a casing inclosing said roll and having a slot for said shaft, and a bearing for said shaft outside of said casing, of a plate having a clearance hole surrounding said shaft and covering said slot and a dust guard against said plate.

43. The combination with a crushing roll, a shaft therefor, a casing inclosing said roll and having a slot for said shaft, and a bearing for said shaft outside of said casing, of a plate having a clearance hole surrounding said shaft, said plate having means for positioning it laterally of said slot and covering said slot and a dust guard outside of and against said plate.

44. The combination with a crushing roll, a shaft therefor, a casing inclosing said roll and having a slot for said shaft, and a bearing for said shaft outside of said casing, of a plate having a clearance hole surrounding said shaft and having means for positioning it longitudinally of said slot covering said slot and a dust guard sliding against the outside of said plate.

45. In combination, an annular crushing die having an internal crushing face, three or more movable and rotatable crushing rolls within and eccentric to said die each having a crushing face reciprocal to that of the latter, means for revolving one of said parts, means for supporting said die, movable members carrying said rolls respectively, and means intermediate of said members yieldingly pressing one of said rolls outwardly away from another of said rolls and reacting against a plurality of said rolls to resist a crushing pressure from the inner face of said die and transmit such pressure from one to another of said rolls with a force that is countervailing in two directions.

46. In combination, an annular crushing die having an internal crushing face, three or more movable and rotatable crushing rolls within and eccentric to said die each having a crushing face reciprocal to that of the latter, means for revolving one of said parts, means for supporting said die, movable members carrying said rolls respectively, and means intermediate of said members pressing two or more of said rolls outwardly and away from one another to resist a crushing pressure from the inner face of said die said means reacting toward two or more of said rolls with a force that is countervailing in two or more directions.

47. In combination, an annular crushing die having an internal crushing face, three or more movable and rotatable crushing rolls within and eccentric to said die each having a crushing face reciprocal to that of the latter, means for revolving one of said parts, means for supporting said die, movable members carrying said rolls respectively, and movable means intermediate of said members for pressing said rolls outwardly away from one another to resist a crushing pressure from the inner face of said die, said means reacting divergently toward said rolls with a force that is countervailing in two or more directions.

48. In combination, an annular crushing die having an internal crushing face, three or more movable and rotatable crushing rolls within and eccentric to said die each having a crushing face reciprocal to that of the latter, means for revolving one of said parts, means for supporting said die, movable members carrying said rolls respectively, and means pressing said rolls outwardly away from one another to resist a crushing pressure from the inner face of said die comprising a movable member reacting toward two or more of said rolls and transmitting movement of one to another with a force that is countervailing in two or more directions and disposed inwardly of said movable members.

49. In combination, an annular crushing die having an internal crushing face, three or more movable and rotatable crushing rolls within and eccentric to said die each having a crushing face reciprocal to that of the latter, means for revolving one of said parts, means for supporting said die, movable members carrying said rolls respectively, and yielding means intermediate of and reacting outwardly toward two or more of said members and pressing two or more of said rolls outwardly and away from one another with a force that is countervailing in two or more directions.

50. In combination, an annular crushing die having an internal crushing face, two or more movable and rotatable crushing rolls within and eccentric to said die each having a crushing face reciprocal to that of the latter, means for revolving one of said parts, means for supporting said die, two or more movable members each carrying one of said rolls, means intermediate of two or more of said members and movable axially of said die holding two or more of said rolls outwardly away from one another to resist a crushing pressure from the inner face of said die.

51. In combination, an annular crushing die having an internal crushing face, two or more movable and rotatable crushing rolls within and eccentric to said die each having a crushing face reciprocal to that of the latter, means for revolving one of said parts, means supporting said die, two or more movable members each carrying one of said rolls, and means yielding axially of said die holding two or more of said rolls outwardly away from one another to resist a crushing pressure from the inner face of said die.

52. In combination, an annular crushing die having an internal crushing face, two or more movable and rotatable crushing rolls within and eccentric to said die each having a crushing face reciprocal to that of the latter, means for revolving one of said parts, means for supporting said die, two or more movable members each carrying one of said rolls, and means adjustable axially of said die for holding said rolls outwardly away from one another to resist a crushing pressure from the inner face of said die.

53. In combination, an annular crushing die having an internal crushing face, two or more movable and rotatable crushing rolls within and eccentric to said die each having a crushing face reciprocal to that of the latter, means for revolving one of said parts, means for supporting said die, two or more movable members each carrying one of said rolls, means for holding two or more of said rolls outwardly away from one another to resist a crushing pressure from the inner face of said die, and a spring or springs reacting axially of said die and actuating said means.

54. In combination, an annular crushing die revolving in an approximately vertical plane and having an internal crushing face, two or more rotatable crushing rolls within and eccentric to said die, movable toward and from each other and each having a peripheral crushing face reciprocal to the inner face of said die, means for revolving one of said parts, members movable toward and from each other in which said rolls are rotatively mounted respectively, movable means intermediate of said members serving to hold two of said rolls outwardly away from one another toward the inner face of said die receiving the inward pressure or stress of one of said rolls and transmitting it to another of said rolls to distribute the pressure between said rolls.

55. In combination, an annular crushing die revolving in a substantially vertical plane and having an internal crushing face, two or more rotatable crushing rolls movable toward and from each other within and eccentric to said die and each having a crushing face reciprocal to that of the latter, means for revolving one of said parts, members movable toward and from each other on which said rolls are rotatively mounted respectively, and means movable transversely of the axis of said die intermediate of said members for holding two or more of said rolls outwardly away from one another for receiving the inward pressure or stress of one of said rolls and imparting it to another of said rolls to distribute the crushing pressure between two or more of said rolls.

56. In combination, an annular crushing die having an internal crushing face, three or more rotatable crushing rolls within and eccentric to said die, one or more of said rolls movable toward and from the other or others, and each of said rolls having a peripheral crushing face reciprocal to the crushing face of said die, means for revolving one of said parts, carrying means on which said rolls are rotatively mounted respectively, and movable compression means intermediate of said carrying means for receiving the inward thrust or pressure of one of said rolls and transmitting it to two other of said rolls.

57. In combination, an annular crushing die revolving in an approximately vertical plane and having an internal crushing face, two or more rotatable crushing rolls movable toward and from each other within and eccentric to said die each having a crushing face reciprocal to that of the latter, means for revolving one of said parts, non-rotative means movable toward and from each other on which said rolls are rotatively mounted respectively, and equalizing means between said non-rotative means resisting the inward stress or pressure of each of said rolls and transmitting it to the other of said rolls to resist a crushing pressure from the inner face of said die.

58. In combination, an annular crushing die having an internal crushing face, two or more rotatable crushing rolls within and eccentric to said die and each having a crushing face reciprocal to that of the latter, means for revolving one of said parts, non-rotative members on which said rolls are rotatively mounted respectively, compression means intermediate of the axes of said rolls for holding said rolls away from one another to resist a crushing pressure from the inner face of said die.

59. In combination, an annular crushing die having an internal crushing face, two or more rotatable crushing rolls within and eccentric to said die each having a crushing face reciprocal to that of the latter, means for revolving one of said parts, means supporting said die, two or more movable members each carrying one of said rolls, and means movable axially of said die holding said rolls outwardly away from one another to resist a crushing pressure from the inner face of said die.

60. In combination, an annular crushing die having an internal crushing face, two or more rotatable crushing rolls within and eccentric to said die each having a crushing face reciprocal to that of the latter, means for revolving one of said parts, means supporting said die, a plurality of adjustable members each carrying one of said rolls, means holding said rolls outwardly away from one another to resist a crushing pressure from the inner face of said die, and means movable axially of said die for relatively adjusting said adjustable members.

61. In combination, an annular crushing die having an internal crushing face, two or more adjustable and rotatable crushing rolls within and eccentric to said die each having a crushing face reciprocal to that of the latter, means revolving one of said parts, and means movable axially of said die for adjusting said rolls.

62. In combination, an annular crushing die having an internal crushing face, two or more rotatable crushing rolls within and eccentric to said die each having a crushing face reciprocal to that of the latter and two of said rolls movable as a group within said die, means for revolving one of said parts, means supporting said parts, a movable member holding said rolls away from one another to resist a crushing pressure from the inner face of said die, and means adjustable axially of said die for adjusting said movable member.

63. In combination, an annular crushing die having an internal crushing face, two or more rotatable crushing rolls within and eccentric to said die each having a crushing face reciprocal to that of the latter, two of said rolls movable as a group within said die, movable non-rotative means carrying said rolls, and rotatable means holding said rolls away from one another to resist a crushing pressure from the inner face of said die.

64. In combination, an annular crushing die having an internal crushing face, two or more rotatable crushing rolls within and eccentric to said die each having a crushing face reciprocal to that of the latter, one of said rolls movable toward and from another of said rolls, means for revolving one of said parts, means supporting said parts, a movable non-rotative member carrying said movable roll, and pressing means disposed inwardly of the axis of said movable roll and acting to press the latter obliquely downwardly and outwardly away from the other of said rolls for holding said rolls outwardly and away from one another to resist a crushing pressure from the inner face of said die.

65. In combination, an annular crushing die having an internal crushing face, two or more rotatable crushing rolls within and eccentric to said die each having a crushing face reciprocal to that of the latter, two of said rolls movable substantially radially of said die, means for revolving one of said parts, movable members carrying said movable rolls respectively, and pivotally mounted means intermediate said members for holding said rolls outwardly away from one another to resist a crushing pressure from the inner face of said die.

66. In combination, an annular crushing die having an internal crushing face, two or more rotatable crushing rolls within and eccentric to said die each having a crushing face reciprocal to that of the latter, two of said rolls movable toward and from each other, means for revolving one of said parts, means for supporting said parts, movable members carrying said movable rolls respectively, and swinging means between said members for holding said rolls outwardly to resist a crushing pressure from the inner face of said die.

67. In combination, an annular crushing die having an internal crushing face, two or more rotatable crushing rolls within and eccentric to said die each having a crushing face reciprocal to that of the latter and one of said rolls movable toward and from another of said rolls, means for revolving one of said parts, means supporting said parts, a moving member carrying said movable rolls, and means movable axially of said die holding said rolls apart to resist a crushing pressure from the inner face of said die.

68. In combination, an annular crushing die having an internal crushing face, two or more rotatable crushing rolls within and eccentric to said die each having a crushing face reciprocal to that of the latter and two of said rolls movable toward and from one another, means for revolving one of said parts, means supporting said parts, movable members carrying the movable rolls respectively, expansively acting means movable axially of said die pressing said movable rolls outwardly away from one another to resist a crushing pressure from the inner face of said die.

69. In combination, an annular crushing die having an internal crushing face, two or more rotatable crushing rolls within and eccentric to said die and each having a crushing face reciprocal to that of the latter, means for revolving one of said parts, non-rotative members movable toward and from each other on which said rolls are rotatively mounted respectively, and divergently acting means distributing the inward stress or pressure of one of said rolls to another of said rolls independently of said die to equalize their outward pressure to resist a crushing pressure from the inner face of said die.

70. In combination, an annular crushing die having an internal crushing face, two or more rotatable crushing rolls within and eccentric to said die and each having a peripheral crushing face reciprocal to that of the latter, means for revolving one of said parts, non-rotative means movable toward and from each other on which said rolls are rotatively mounted respectively, and radially outwardly pressing means intermediate of the axes of said rolls for holding said rolls outwardly away from another to resist a crushing pressure from the inner face of said die.

71. In combination, an annular crushing die having an internal crushing face, two or more rotatable crushing rolls within and eccentric to said die each having a crushing face reciprocal to that of the latter, two of said rolls movable toward and from one another, means for revolving one of said parts, means supporting said parts, movable means carrying said movable rolls respectively, separate means for holding said movable rolls outward and away from one another to resist a crushing pressure from the inner face of said die, and movable means connecting said separate means to equalize their action.

72. In combination, an annular crushing die having an internal crushing face, two rotatable crushing rolls within and eccentric to said die each having a crushing face reciprocal to that of the latter and one of said rolls movable toward and from another of said rolls, means for revolving one of said parts, means supporting said parts, a movable member carrying said movable roll, expansively acting adjustable means at each side of said movable roll for holding it outwardly and away from another of said rolls, and an adjusting connection between said expansive means.

73. In combination, an annular crushing die having an internal crushing face, two or more rotatable crushing rolls within and eccentric to said die, each having a crushing face reciprocal to that of the latter and one of said rolls movable toward and from another of said rolls, means for revolving one of said parts, means supporting said parts, a non-rotative movable member carrying said movable roll, yielding means at each side of said movable roll for holding it outwardly and away from another of said rolls, and a movable connection between said yielding means.

74. In combination, an annular crushing die having an internal crushing face, two or more rotatable crushing rolls within and eccentric to said die each having a crushing face reciprocal to that of the latter and one of said rolls movable toward and from another of said rolls, means for revolving one of said parts, means supporting said parts, a movable member carrying said movable roll, and means floating axially of said die holding said rolls outwardly away from one another to resist a crushing pressure from the inner face of said die.

75. In combination, an annular crushing die having an internal crushing face, two or more rotatable crushing rolls within and eccentric to said die each having a crushing face reciprocal to that of the latter, two of said rolls movable toward and from one another, means for revolving one of said parts, means supporting said parts, movable members on which said movable rolls are mounted, and means holding said movable rolls outwardly away from one another floating axially and circumferentially of said movable rolls.

76. In combination, an annular crushing die having an internal crushing face, two or more rotatable crushing rolls within and eccentric to said die each having a crushing face reciprocal to that of the latter and one of said rolls movable toward and from another of said rolls, means for revolving one of said parts, means supporting said parts, a movable member on which said movable roll is mounted, and oscillatory means pressing said rolls outwardly away from one another to resist a crushing pressure from the inner face of said die and reacting outwardly toward two or more of said rolls with a force that is countervailing in both directions.

77. In combination, an annular crushing die having an internal crushing face, two or more rotatable crushing rolls within and eccentric to said die each having a crushing face reciprocal to that of the latter, one of said rolls movable toward and from another of said rolls, means revolving one of said parts, a movable member on which said movable roll is mounted, and rotatable means pressing said movable roll outwardly away from another of said rolls to resist a crushing pressure from the inner face of said die.

78. In combination, an annular crushing die having an internal crushing face, two or more rotatable crushing rolls within and eccentric to said die each having a crushing face reciprocal to that of the latter and one of said rolls movable toward and from another of said rolls, means for revolving one of said parts a non-rotative movable member on which said movable roll is rotatively mounted, thrust members movable substantially longitudinally of the axis of said die, and serving to resist the inward stress or pressure of said rolls and yielding means resisting said thrust members.

79. In combination, an annular crushing die having an internal crushing face, two or more rotatable crushing rolls within and eccentric to said die each having a crushing face reciprocal to that of the latter and one of said rolls movable toward and from another of said rolls, means for revolving one of said parts, a movable member on which said movable roll is mounted, and a slidingly mounted thrust member for pressing said rolls outwardly away from one another to resist a crushing pressure from the inner face of said die.

80. In combination, an annular crushing die having an internal crushing face, two or more rotatable crushing rolls within and eccentric to said die each having a crushing face reciprocal to that of the latter and one of said rolls movable toward and from another of said rolls, means for revolving one of said parts, means supporting said parts, a member on which one of said parts is mounted, a pivotally mounted movable member on which said movable roll is mounted, and means intermediate of said members pressing two or more of said rolls outwardly away from one another.

81. In combination, an annular crushing die having an internal crushing face, two or more rotatable crushing rolls within and eccentric to said die and each having a peripheral crushing face reciprocal to the inner face of the latter, two or more of said rolls movable toward and from one another, means for revolving one of said parts, nonrotative movable members on which said movable rolls are rotatively mounted respectively, thrust members resisting the inward stress or pressure of said movable rolls, and movable means engaging said thrust members and distributing the thrust or stress of one to another.

82. In combination, an annular crushing die having an internal crushing face, two or more rotatable crushing rolls within and eccentric to said die each having a crushing face reciprocal to that of the latter and one of said rolls movable toward and from another of said rolls, means for revolving one of said parts, means supporting said parts, a member on which one of said rolls is mounted, a pivotally mounted member on which said movable roll is mounted, and spring actuated means intermediate of said members pressing said rolls outwardly away from one another to resist a crushing pressure from the inner face of said die.

83. In combination, an annular crushing die having an internal crushing face, two or more rotatable crushing rolls within and eccentric to said die, each having a crushing face reciprocal to that of the latter and one of said rolls movable toward and from another of said rolls, means for revolving one of said parts, means supporting said parts, a member on which one of said rolls is mounted, a pivotally mounted member on which said movable roll is mounted, and means pressing said rolls outwardly away from one another to resist a crushing pressure from the inner face of said die comprising a spring or springs intermediate of said members.

84. In combination, an annular crushing die having an internal crushing face, two or more rotatable crushing rolls within and eccentric to said die each having a crushing face reciprocal to that of the latter and one of said rolls movable toward and from another of said rolls, means for revolving one of said parts, means supporting said parts, a member on which one of said rolls is mounted, a pivotally mounted member on which said movable roll is mounted, and movable means intermediate of said members swinging said pivotally mounted member outwardly and holding said movable roll outwardly away from another of said rolls to resist a crushing pressure from the inner face of said die.

85. In combination, an annular crushing die having an internal crushing face, two or more movable and rotatable crushing rolls within and eccentric to said die each having a crushing face reciprocal to that of the latter, means for revolving one of said parts, means supporting said parts, two or more pivotally mounted members on each of which one of said rolls is mounted respectively, and spring mounted means intermediate of said members for pressing said rolls outwardly to resist a crushing pressure from the inner face of said die.

86. In combination an annular crushing die having an internal crushing face, two or more movable and rotatable crushing rolls within and eccentric to said die each having a crushing face reciprocal to that of the latter, said rolls movable toward and from one another, means for revolving one of said parts, two or more pivotally mounted members on which said rolls are mounted respectively, and movable means intermediate of said members holding said rolls outwardly away from one another and acting toward two or more of said rolls and transmitting the thrust from one to another with a force that is countervailing in both directions.

87. In combination, an annular crushing die having an internal crushing face, two or more rotatable crushing rolls movable toward and from one another within and eccentric to said die each having a crushing face reciprocal to that of the latter, means for revolving one of said parts, two or more pivotally mounted members on which said movable rolls are mounted respectively, and means adjustable axially of said members for holding said rolls outwardly away from one another to resist a crushing pressure from the inner face of said die.

88. In combination, an annular crushing die having an internal crushing face, two or more rotatable crushing rolls movable toward and from each other within and eccentric to said die each having a crushing face reciprocal to that of the latter, means for revolving one of said parts, means supporting said parts, two or more swinging members on which said rolls are mounted respectively, pivotally mounted on axes approximately parallel with the axis of said die, and means intermediate of said members for holding said rolls outwardly away from one another to resist a crushing pressure from the inner face of said die.

89. In combination, an annular crushing die having an internal crushing face, two or more rotatable crushing rolls movable toward and from one another within and eccentric to said die each having a crushing face reciprocal to that of the latter, means for revolving one of said parts, means supporting said parts, two or more swinging members on which said rolls are mounted respectively, and a spring or springs reacting axially of said die and serving to press two or more of said rolls outwardly away from one another to resist a crushing pressure from the inner face of said die.

90. In combination, an annular crushing die having an internal crushing face, two or more rotatable crushing rolls movable toward and from one another within and eccentric to said die each having a crushing face reciprocal to that of the latter, means for revolving one of said parts, means supporting said parts, swinging members on which said rolls are mounted respectively, and a spring or springs intermediate of said members for pressing said rolls outwardly away from one another to resist a crushing pressure from the inner face of said die.

91. In combination, an annular crushing die having an internal crushing face, two or more rotatable crushing rolls movable toward and from one another within and eccentric to said die each having a crushing face reciprocal to that of the latter, means for revolving one of said parts, means supporting said parts, pivotally mounted members on which said rolls are mounted respectively, and means intermediate of said members holding two of said rolls outwardly away from one another and transmitting the movement of one to another to resist a crushing pressure from the inner face of said die.

92. In combination, an annular crushing die having an internal crushing face, two or more rotatable crushing rolls movable toward and from one another within and eccentric to said die each having a crushing face reciprocal to that of the latter, means for revolving one of said parts, two or more pivotally mounted members on which said rolls are mounted respectively, and means movable axially of said die for holding said rolls outwardly away from one another to resist a crushing pressure from the inner face of said die.

93. In combination, an annular crushing die having an internal crushing face, two or more rotatable crushing rolls movable toward and from one another within and eccentric to said die each having a crushing face reciprocal to that of the latter, means for revolving one of said parts, means supporting said parts, two or more movable members on which said rolls are mounted respectively, and movable means adjustable axially of said die for holding said rolls outwardly away from one another to resist a crushing pressure from the inner face of said die.

94. In combination, an annular crushing die revolving in an approximately vertical plane and having an internal crushing face, two or more rotatable crushing rolls movable toward and from one another within and eccentric to said die each having a crushing face reciprocal to that of the latter, means for revolving one of said parts, non-rotative movable members on which said rolls are rotatively mounted respectively, and movable means intermediate of said members for resisting the inward stress or pressure of two or more of said rolls and serving to communicate stress or pressure of one to the other.

95. In combination, an annular crushing die having an internal crushing face, two or more rotatable crushing rolls movable toward and from one another within and eccentric to said die each having a crushing face reciprocal to that of the latter, means for revolving one of said parts, means supporting said parts, movable swinging members on which said rolls are mounted respectively, and compression members intermediate of said swinging members acting to hold said members outwardly away from one another to resist a crushing pressure from the inner face of said die.

96. In combination, an annular crushing die having an internal crushing face, two or more rotatable crushing rolls movable toward and from one another within and eccentric to said die each having a crushing face reciprocal to that of the latter, means for revolving one of said parts, means supporting said parts, swinging members on which said rolls are mounted respectively, and a floating member intermediate of said swinging members and participating in the movements of said rolls for holding said rolls outwardly away from one another to resist a crushing pressure from the inner face of said die.

97. In combination, an annular crushing die having an internal crushing face, two or more rotatable crushing rolls movable toward and from one another within and eccentric to said die and each having a peripheral crushing face reciprocal to that of the latter, means for revolving one of said parts, non-rotative movable members on which said rolls are rotatively mounted respectively, and divergently acting compression members intermediate of said non-rotative members for holding said rolls away from one another to resist a crushing pressure from the inner face of said die.

98. In combination, an annular crushing die revolving in an approximately vertical plane and having an internal crushing face, three or more rotatable crushing rolls movable toward and from each other within and eccentric to said die and each having a crushing face reciprocal to that of the latter, means for revolving one of said parts, movable means on which three of said rolls are rotatively mounted respectively, pressing means for pressing said rolls outwardly away from one another to resist an inward stress or crushing pressure from the inner face of said die, and transmitting means movable relatively to said die resisting the stress of said pressing means and transmitting that of each roll to two or more of the other rolls.

99. In combination, an annular crushing die revolving in an approximately vertical plane and having an internal crushing face, two or more rotatable crushing rolls within and eccentric to said die and each having a crushing face reciprocal to that of the latter, means for revolving one of said parts, movable members movable toward and from each other on which said rolls are rotatively mounted respectively, and reversely inclined pressing means for holding two or more of said rolls outwardly away from one another to resist a crushing pressure from the inner face of said die serving to communicate the inward stress or pressure of one of said rolls to another of said rolls.

100. In combination, an annular crushing die having an internal crushing face, a movable and rotatable crushing roll within and eccentric to said die and having a peripheral crushing face reciprocal to that of the latter, means for revolving one of said parts, a movable member on which said roll is rotatively mounted, and a diagonally acting compression member pressing said roll outwardly toward the inner face of said die to resist a crushing pressure therefrom and movable axially of said die.

101. The combination with crushing members, and a feed casing having a plurality of chutes straddling said members and leading to the interior of one of said members, and a revolving feeder above said chutes, of hollow liners in said casing consisting of separate removable sections.

In witness whereof, I have hereunto signed my name in the presence of two subscribing witnesses.

GEORGE H. FRASER.

Witnesses:
 FRED WHITE,
 ARTHUR C. PATTON.